United States Patent [19]

Wun

[11] 4,310,427
[45] Jan. 12, 1982

[54] WATER DISPERSIBLE BAND PLY LUBRICANT

[75] Inventor: Ten T. Wun, Palos Hills, Ill.

[73] Assignee: Nalco Chemical Company, Oak Brook, Ill.

[21] Appl. No.: 144,180

[22] Filed: Apr. 25, 1980

[51] Int. Cl.$^3$ .................. C10M 3/02; C10M 3/04
[52] U.S. Cl. ..................... 252/21; 252/49.3
[58] Field of Search .......... 252/21, 28, 49.5, 37.2, 252/49.3

[56] References Cited

U.S. PATENT DOCUMENTS

| | | | |
|---|---|---|---|
| 2,937,406 | 5/1960 | Loddy | 425/53 |
| 3,401,550 | 9/1968 | Tarpinian et al. | 73/10 |
| 3,406,236 | 10/1968 | Kniege | 106/38.22 |
| 3,454,495 | 7/1969 | Schneider | 252/21 |
| 3,532,624 | 10/1970 | Cekada | 252/28 |
| 3,713,851 | 1/1973 | Cekada | 252/28 |
| 3,872,038 | 3/1975 | Adams et al. | 106/38.22 |
| 3,905,823 | 9/1975 | Piskoti | 106/38.22 |
| 3,967,968 | 7/1976 | Stone et al. | 252/28 |
| 4,043,924 | 8/1977 | Traver | 252/21 |
| 4,045,362 | 8/1977 | Kuan et al. | 252/49.3 X |
| 4,125,470 | 11/1978 | Fenton | 252/27 |
| 4,179,321 | 12/1979 | Verghese | 156/118 |

*Primary Examiner*—Andrew Metz
*Attorney, Agent, or Firm*—Richard G. Smith; John G. Premo; Robert A. Miller

[57] ABSTRACT

Band ply lubricants, sometimes referred to as inside tire casing lubricants or inside tire dopes, are used as friction reducing and surface protective coatings during the cure of bias ply tires in particular and are applied intermediately between the interior surface of the green tire carcass and the exterior surface of a rubber bladder. A silicone and volatile hydrocarbon free, water reducible paste product comprising a zinc soap of a long chain fatty acid (zinc stearate), a long chain fatty acid ester of sorbitan, an alkylene oxide-alkylene glycol polymer and mica are combined to produce a paste which is reduced to application viscosity by spraying with approximately an equal weight of water is provided to eliminate the more costly emulsions and hydrocarbon solvent containing inside tire curing lubricants without sacrifice in quality.

6 Claims, No Drawings

WATER DISPERSIBLE BAND PLY LUBRICANT

BACKGROUND OF THE INVENTION

Products intended for the purposes of this invention have been in use since the earliest production manufacture of automobile tires. Tire making is still essentially a hand operation with the tire built up in a general barrel shape, open at top and bottom, and the uncured or green tire coated on the outside with an anti-blemish lubricant coating and the inside area of contact between a rubber bladder and the interior of the tire casing interface needs be lubricated with an inside tire coating lubricant or dope. The latter compositions are here of specific interest.

Subsequent to drying of the inside and outside of the uncured green tire, it is bag molded in what are commonly referred to as Bag-O-Matic molds. A rubber bladder expanded by a hot fluid, either liquid or gas, pushes the tire carcass into the cavity of the metal tire mold. The interior tire lubricant composition, as here more fully developed, provides lubricity between the exterior surface of the rubber bladder and the interior mold-created side walls of the cured tire. Additionally the interior, or inside tire coating must also permit entrapped air to be released which accumulates in the interface as the final shape of the tire is determined by the mold contour. In addition the coating must permit ready and free release of the rubber bladder from the tire interior after cure. The interior tire coating can contribute materially to the tire molding costs if one or more of the components of the subject coating contribute to deterioration of the bladder, or have residual deposit of components interiorly of the tire which may influence the service life in use of the tire carcass after the molding operation. Lubricity created by the coating is particularly important to the end of centering the tire in the mold, as well as preventing flaws from developing in the side walls and tread of the body.

After the mold is closed, the pressure of the hot fluid within the rubber bladder creates internal pressure in the metal mold. The tire while in the mold is heated from both outside and inside. The green tire or uncured rubber initially softens, forcing the tread into the negative tread pattern of the mold.

In the manufacture of bias ply tires in particular, there is a higher than usual "turn down" ratio (side wall bending process step) than in manufacture of most other tire qualities. Lubrication between the exterior walls of the expanding rubber bladder and the interior of the tire is particularly critical. Preferably the inside lubricant coating remains on the interior surface of the tire to leave the bladder surface free of foreign matter on withdrawal of the cured tire from the mold. The technology is more fully reviewed in U.S. Pat. No. 2,937,406 where Toddy describes the tire molding process in more complete detail.

Historically, dry powders were dusted onto the interior surfaces of the "green" tire body before cure in the mold. Mica, talc and graphite were used to provide lubrication and release. Control of the surface coating was obviously difficult, if not impossible.

With the rapid development of silicone chemistry, silicones in hydrocarbon solvents were formulated with various other products including mica. Proportions were found to be relatively critical to overcome blemishes, buckeled bladders, kinked tire beads, trapped air, etc. Additionally health hazards to the operators including fire and toxicity to hydrocarbon chemicals were objectionable.

Silicone emulsions were later developed permitting introduction of water to replace, at least in part, undesirable volatile hydrocarbons. However, emulsions are subject to instability and require other additives to permit storage life without deterioration.

So far as is known, a water-reducible paste product devoid of silicones has not heretofor been successfully introduced. It has been general experience that lubricity has not been of the order equal to the silicones, thus tire manufacturers have been willing to meet the additional costs such limitations inherently introduced in inside tire lubricants.

It is the principal objective of this invention to provide a volatile hydrocarbon free coating composition whose only volatile component is required for application on the job and consists essentially of water.

It is a further objective to provide a silicone-free, water-reducible band ply interior lubricant which has the quality of lubricity which is substantially equivalent to the prior, more costly silicone-containing coatings.

SUMMARY OF THE INVENTION

This invention broadly overcomes problems priorly inherent in hydrocarbon solvent reduced silicone band ply lubricants and their later second or third generation descendants where water reducible emulsions of silicone polymers were formulated to provide excellent lubricity at little or no cost reduction.

In the research leading to the advance of eliminating the silicones, the difficulty overcome was to maintain the excellent lubricity and performance of the prior art silicone products, to eliminate the need for volatile organic solvents, and to avoid the essential stabilizers or thickeners and protective colloids commonly required in emulsion systems and yet reduce the economic charges against the operation through longer life of the rubber bladders and less cost of the lubricating compositions required to do the job.

The compositions of this invention in use comprise a volatile phase which provides the essential liquidity of the system for spray application. The volatile phase is essentially water, and represents from about 90% to about 40% of the total composition at usual spray application viscosity.

The non-volatile phase of the compositions of this invention when mixed and formulated together provide a very heavy paste which is reduced with water, as the volatile phase described above indicates. While it is feasible to supply the 100% non-volatile, non-silicone paste product which constitutes the essential novel features of my advance in the art of tire molding, it is probably more practical to include some, or all of the water phase to reduce the time and increase the simplicity of use of the product at the point of use. Thus, the water content of the final product at time of use is a matter of practice, and is optional, dictated by the mechanical requirements of spray applicators.

The essential paste compositions of this invention have been found to provide preferable qualities within plus or minus 5% of the weights percentage of the essential components as set out below. The best mode presently known to practice the reduction to practice of the formula or composition is set out below in a relatively broad range, where the parts by weight have been indicated in percentage ranges.

The first essential component is present in from 3% to 12% of the total solids, or non-volatile content of the composition. We prefer to use zinc stearate though it is well understood that other zinc soaps of long chain fatty acids, illustratively oleic, myristic, palmitic and those representative of the fatty acid mixtures derived from vegetable oils in the $C_{14}$ to $C_{20}$ carbon chain length all function substantially similarly with due regard for costs, increase in melting points, saturation or unsaturation and general availability.

A second component, useful in an essentially similar weight percentage range is a synthetic organic compound produced by the partial esterification of sorbitan (where at least two of the hydroxyl groups remain unreacted) with a long chain fatty acid of from about $C_{14}$ to $C_{20}$ fatty acid. We have found a commercially available product identified as sorbitan sesqui oleate having about 1.5 hydroxyls esterified (sold under the trade name "Aracel 83") is a convenient and useful component product within the scope of the above defined useful partial esters.

The third component is a water soluble lubricating oil produced by condensation of alkylene glycols or alkylene oxides to produce a polymer having a molecular weight in excess of about 1000. The alkylene groups of the glycol and the alkylene groups of the useful alkylene oxides are of the general size of ethylene and propylene. However, in the preferred form of the water soluble oil the polymer was prepared from ethylene oxide and propylene oxide in a 1:1 molal ratio. The preferred synthetic lubricants are also available commercially (Ucon 50 HB660).

The last essential component is usually present in the largest weight percentage of the non-volatile components of the coating and is a ground mica of approximately 325 mesh. If selection permits a quality where the size frequency analysis of the product shows the most uniform distribution of particle size within the sample is preferred for the present end use.

The above ingredients are mixed together in a heavy duty paste mixer, illustratively, a rotary mixer of the Werner-Pfleiderer type is useful. Water may be incorporated to reduce the stiffness of the paste to any required degree to suit the methods elected for packaging and handling of the final mix for ease of production and consumer use.

For spray application at the point of use, the ratio of the non-volatile components of the formula to the volatile, or water content, is from about 45:55 to about 60:40. This is a non-critical factor and the extent of the reduction for application is well understood in production spray equipment end use.

The invention has been reduced to practice in field trials where the product was interiorly applied to green tire carcass in a production line using Bag-O-Matic curing molds. A preferred formula was reduced to the viscosity required for the automatic spray tank, but as it was not a commercial use, was hand sprayed without difficulty and deemed to be operable if substituted in the plant equipment. The interior of the green tire was hand sprayed with the product immediately followed with an anti-blemish paint on the exterior surface. Cured tires were released with equal facility to prior art silicone products. No blemishes were observed inside the tires indicating good air bleed. Bladders after each cure were neither kinked nor buckeled indicating good lubricity favorably compared with the silicone lubricant in current use. In a second run, new bladders were installed. After 64 cure cycles per bladder there was no indication of abbreviated bladder life.

DETAILED DESCRIPTION OF THE INVENTION

The following Examples set out the best mode known presently to practice the compounding of the formulas of this invention. The variation in range of weight percentage have been previously indicated along with a generic description of the specific ingredients essential. The specific examples are generally presented in weight percent, otherwise in parts by weight.

EXAMPLE I

| | | |
|---|---|---|
| 3.93 | parts | Partial oleic acid ester of sorbitan |
| 19.64 | parts | Polyalkylene glycols prepared from 1:1 ratio of ethylene oxide to propylene oxide. Molecular weight above 1000. |
| 45 | parts | Water |
| 3.93 | parts | Zinc stearate |
| 27.9 | parts | 325 mesh water ground mica |

The above ingredients were thoroughly mixed to produce a material with a sprayable viscosity.

It is noted that the amount of water utilized can be varied and it is within the scope of this invention to ship a material containing no water and to complete the product at its use site by adding water, if necessary.

All of the above components are commercially available from reliable sources as those in the art will know or can determine without inventive skill.

It has been found advantageous to adjust the pH of the final mix to be on the acid side. A pH of 6.0 to 6.7 has been useful and 6.2 has been commonly used.

Inside tire lubricants have been prepared and tested against silicone containing formulas both in the laboratory and in plant trial.

The amount of zinc stearate has been increased over the preferred mode set out in Example I by a 100% factor for increased lubricity development. The amount of mica has also been increased in certain instances where air bleed was thought to be low in certain uses of the preferred, illustrative Example I.

Lubricity has been extensively studied and while more than a dozen chemical additives have been investigated, zinc stearate could not be reasonably replaced in the composition. The least sensitive component as to weight percentage in the overall composition was found to be the polyalkylene glycols and the extent of departure from the herein noted limits has not been fully investigated.

Lubricity studies using the method of Tarpinian et al. U.S. Pat. No. 3,401,550 established that the partial fatty acid esters of sorbitan, particularly sorbitan sesqui oleate, appeared to effectively increase the lubricating quality of the zinc stearate component disproportionately to the quantity present, and if not present, markedly reduced the overall lubricity of the essential composition.

While other prior art agents such as wetting agents, protective colloids and thickeners may be added to the preferred compositions, we have not found their use to be essential, however, may be permissive for meeting specifications of individuals users of the products of this invention.

A concentrate material was prepared by blending together the following ingredients:

EXAMPLE II

| | | |
|---|---|---|
| 7.0 parts | Zinc stearate | |
| 7.0 parts | Partial oleic acid ester of sorbitan | |
| 36.0 parts | Polyalkylene glycols prepared from 1:1 ratio of ethylene oxide to propylene oxide. Molecular weight above 1000. | |
| 50.0 parts | 325 mesh water ground mica | |

The concentrate material so prepared, when thinned to a sprayable viscosity with water was found to be an effective band ply lubricant in accordance with this invention.

The following list of References is of interest:

Article: "Preformulated Band Ply Lubricants"—Rubber Age, pgs. 52–54—Dawson & Sorkin—December, 1972

Patents of interest:

U.S. Pat. Nos.:
1. 2,937,406 Toddy
2. 3,401,550 Tarpinian et al.
3. 3,532,624 Cekada
4. 3,713,851 Cekada
5. 3,872,038 Adams et al.
6. 3,905,823 Piskoti
7. 3,967,968 Stone et al.
8. 4,043,924 Traver
9. 4,125,470 Fentar et al.
10. 3,406,236 Kinege Having described the best mode of practice of the herein disclosed invention, what is claimed is:

1. A water reducible band ply lubricant composition consisting essentially of from 3 to 12% of a zinc soap of a long chain fatty acid, from 3 to 12% of a long chain fatty acid partial ester of sorbitan where at least two of the hydroxyl groups are not esterified; from 20 to 60% of a water soluble polymeric lubricant, the polymeric lubricant comprising the condensation product of alkylene glycols or alkylene oxides limited to alkylene groups containing more than one and less than four carbon atoms in the alkylene chain and a molecular weight in excess of 1,000; and from 30 to 74% of finely divided mica; all of the foregoing percents based upon the total non-volatile solids content, the foregoing non-volatile solids content thereof dispersed in an amount of water as the volatile content thereof sufficient to produce fluidity essential for application in a lubricating film.

2. The composition of claim 1, wherein the zinc soap is zinc stearate and the zinc sterate and the partial fatty acid ester of sorbitan each constitute from about 3% to 12% of the total non-volatile solids, the water soluble polymeric condensate of alkylene glycols or alkylene oxides is from about 20% to 60%, the mica is about 325 mesh and is from about 30% to about 74% by weight of the total non-volatile component, and for application as a lubricant spray the volatile water content is from about 30% to 60% by weight of the total ready-to-apply lubricant composition.

3. The composition of claim 1, wherein the partial ester of sorbitan contains about 1.5 moles of oleic acid per mol of sorbitan; the water soluble polymeric lubricant is an ethylene oxide—propylene oxide polymeric condensate at a mol ratio of about 1:1.

4. The composition of claim 2, wherein the zinc stearate and the partial fatty acid ester of sorbitan are each about 7%; the polymeric condensate of alkylene glycols or alkylene oxides is about 35% and the mica is about 50% by weight; and the sole reducing liquid is water, the ratio of non-volatile to volatile for spray application is from about 45:55 to 60:40.

5. The composition of claim 2 where the sorbitan ester is sorbitan sesqui oleate and the water soluble polymeric lubricant has a molecular weight about 1000 and is derived from ethylene oxide and propylene oxide which are condensed at a mol ratio of about 1:1 to produce said polymeric lubricant.

6. The method of lubricating band ply and radial ply tires during manufacture which comprises lubricating said tires by application of the aqueous lubricating composition of claim 1.

* * * * *

UNITED STATES PATENT AND TRADEMARK OFFICE
CERTIFICATE OF CORRECTION

PATENT NO. : 4,310,427
DATED : January 12, 1982
INVENTOR(S) : Ten T. Wun

It is certified that error appears in the above-identified patent and that said Letters Patent are hereby corrected as shown below:

In the patent heading, the correct name of the inventor has been incorrectly ordered. The order of names is incorrectly entered and should be corrected to read:

Inventor: Wun Ten Tai

*Signed and Sealed this*

*Twenty-third* Day of *March 1982*

|SEAL|

*Attest:*

GERALD J. MOSSINGHOFF

*Attesting Officer*     *Commissioner of Patents and Trademarks*